Oct. 11, 1949.  A. H. JACKSON  2,484,094
CASTER BRAKE
Filed Aug. 19, 1946
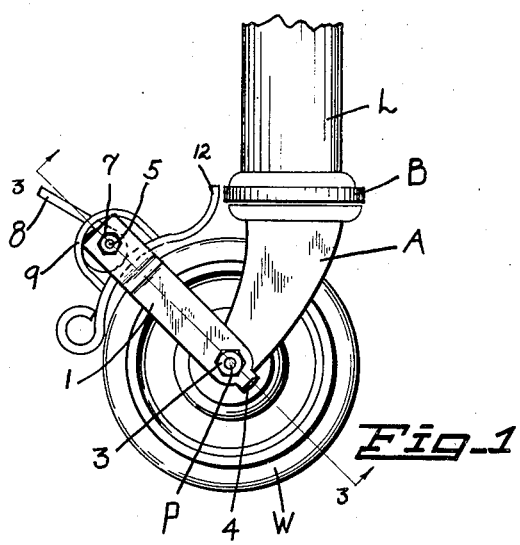
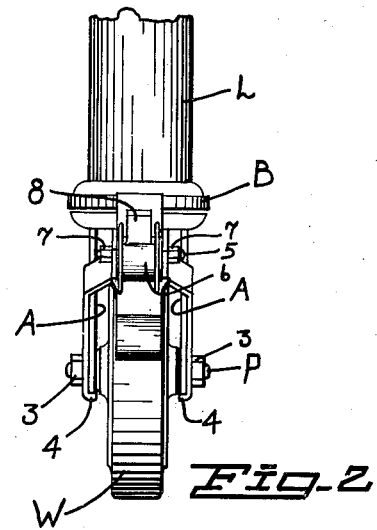
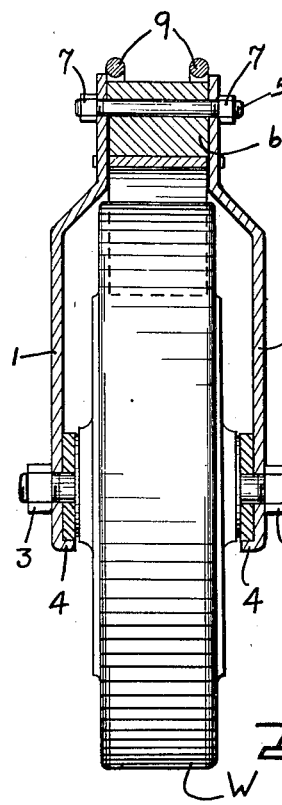
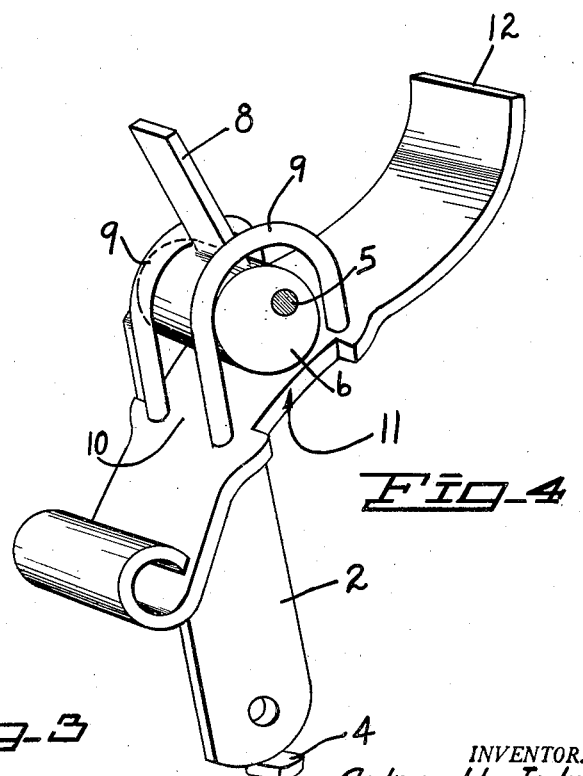
INVENTOR.
Andrew H. Jackson
BY
Glenn L. Fish
ATTORNEY Patented Oct. 11, 1949

2,484,094

UNITED STATES PATENT OFFICE 2,484,094

CASTER BRAKE

Andrew H. Jackson, Opportunity, Wash.

Application August 19, 1946, Serial No. 691,568

2 Claims. (Cl. 16—35)

My present invention relates to an improved caster brake which, while adapted for use with various types of wheels is especially designed for use with caster wheels forming the equipment for wheeled furniture such as hospital carts, stretchers, tables, and similar appliances.

The primary object of the invention is the provision of a brake device composed of a minimum number of parts that may be manufactured with facility at low cost of production, and assembled as a component part of the caster wheel, to insure an effective frictional engagement with the wheel, and which is simple in construction and operation in order that the brake may be applied and released by foot-pressure from the tip of a shoe.

The invention consists in certain novel combinations and arrangements of a holder, a resilient brake shoe, and eccentrically mounted means for applying and releasing the shoe as will be described and more specifically set forth in the appended claims.

In the accompanying drawings I have illustrated one complete example of the physical embodiment of my invention wherein these parts are combined and arranged in accord with one mode I have devised for the practical application of the principles of my invention; but it will be understood that various changes and alterations are contemplated and may be made in these exemplifying drawings and mechanical structures within the scope of the claims without departing from the principles of my invention.

Figure 1 is a side view of a caster wheel equipped with a brake device of my invention.

Figure 2 is an edge view as seen from the left in Fig. 1.

Figure 3 is an enlarged detail sectional view as at line 3—3 of Fig. 1; and

Figure 4 is a perspective view of the braking device with some parts omitted for convenience of illustration, and detached from the caster wheel.

In order that the general arrangement and utility of parts may readily be understood I have disclosed a conventional caster wheel unit for supporting a furniture leg L, which unit includes the ball bearing head or cap B mounted on the lower end of the leg, with the usual fork arms A, A, in which the wheel W is journaled on the axle or pin P.

In equipping the caster wheel with the brake-device of my invention, the journal pin or axle and the fork arms are utilized to support a yoke or holder that includes a pair of side arms 1 and 2 which are perforated, bored, or drilled to slip over the opposite ends of the pin P exterior of the fork arms A, A, and nuts 3 are mounted on the protruding threaded ends of the pin to retain the yoke or holder in correct position.

Each side arm of the holder, at its lower end, is fashioned with an inwardly projecting stop lug 4 that engages a portion of a fork arm to prevent downward swing of the holder and to retain the brake device in operative relation to the caster wheel.

The free upper ends of the arms of the holder are united by a bolt or pin 5, which is passed through holes in the arms and through an eccentric bore in a cylindrical cam block or head 6, and lock nuts 7, 7, are threaded on the ends of the pin 5 to retain the parts in operative position.

The cam head 6 is journaled to rock or partially turn on the pin, and a lever arm 8, rigid with the head may be foot-pressed for this purpose. The eccentric cam is confined within a cage or suspending device here shown as a pair of spaced U-shaped loops 9, 9, that surround the cylindrical head, and the four ends of these two loops are rigidly fastened, as by welding, to a bowed plate 10 of resilient metal which forms the depressible shoe of the brake and is adapted for frictional engagement with the exterior periphery of the caster wheel.

As best seen in Fig. 4 the opposite side edges of the bowed plate or shoe 10 are mortised or notched as at 11 to form sockets that receive and fit about the arms of the yoke or holder, and the arms serve as guides for the shoe as it is depressed or flexed. In addition the arms retain the mortised shoe against lateral displacement as well as against longitudinal displacement with relation to the holder or yoke.

One blunt end of the brake shoe is curled, as shown, while the other end 12 merges with the bowed part of the shoe to form a compound curve located adjacent the bearing head B of the caster wheel. As best seen in Fig. 1 this end 12, by contact with the bearing head, acts as a stop for the resilient shoe, but it does not interfere with the depressing movement of the bowed portion of the shoe.

By foot pressure against the lever 8 the eccentric cam may be turned to depress the resilient shoe into frictional engagement with the caster wheel, and, due to the eccentricity of the cam the wheel may be locked against turning and held in stationary position. By reverse foot-pressure against the cam lever, the cam may be released, and the resilient shoe automatically is released from contact with the wheel.

Having thus fully described my invention, what I claim as new and desire to secure by Letters Patent is:

1. In a friction brake for a caster wheel having a journal pin and fork arms, the combination with a holder including spaced side arms mounted on the pin, and integral inwardly bent lugs on the side arms engaging the edges of the fork arms, of a resilient depressible shoe mounted in the holder for engagement with the wheel, and means for depressing the shoe.

2. In a friction brake for a caster wheel having a journal pin and fork arms, the combination with a holder including spaced side arms mounted on the pin, and lugs on the side arms engaging the edges of the fork arms, of a resilient depressible shoe mounted on the holder and having lateral edge mortises having angular retaining walls engaging the side arms, an eccentric cam mounted in the holder for actuating the shoe, and means for turning the cam head to depress the shoe into engagement with the wheel.

ANDREW H. JACKSON.

REFERENCES CITED

The following references are of record in the file of this patent:

UNITED STATES PATENTS

| Number | Name | Date |
|---|---|---|
| 2,147,064 | Schultz | Feb. 14, 1939 |
| 2,262,433 | Uecker et al. | Nov. 11, 1941 |
| 2,345,442 | Winter et al. | Mar. 28, 1944 |
| 2,366,927 | Noelting et al. | Jan. 9, 1945 |